United States Patent
Chauhan et al.

(10) Patent No.: US 12,250,636 B2
(45) Date of Patent: Mar. 11, 2025

(54) POWER MANAGEMENT IN BATTERY POWERED COMMUNICATION DEVICE AND METHOD

(71) Applicant: Intel Corporation, Santa Clara, CA (US)

(72) Inventors: Shailendra Singh Chauhan, Bangalore (IN); Santhosh Ap, Bangalore (IN); Arunthathi Chandrabose, Bangalore (IN); Mythili Hegde, Banglaore (IN)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 17/520,768

(22) Filed: Nov. 8, 2021

(65) Prior Publication Data
US 2023/0141967 A1  May 11, 2023

(51) Int. Cl.
| H04W 52/02 | (2009.01) |
| G06F 1/26 | (2006.01) |
| H04B 7/0413 | (2017.01) |
| H04W 84/12 | (2009.01) |

(52) U.S. Cl.
CPC ...... H04W 52/0261 (2013.01); H04B 7/0413 (2013.01); H04W 84/12 (2013.01)

(58) Field of Classification Search
CPC .............. H04W 52/0261; H04W 84/12; H04B 7/0413; G06F 1/266; Y02D 30/70
See application file for complete search history.

(56) References Cited

U.S. PATENT DOCUMENTS

| 2007/0076665 A1* | 4/2007 | Nair ...................... H04W 48/18 370/335 |
| 2016/0285757 A1 | 9/2016 | Srivastava et al. |
| 2017/0353226 A1* | 12/2017 | HomChaudhuri ... H04B 7/0689 |
| 2018/0356873 A1 | 12/2018 | Regupathy et al. |
| 2020/0008151 A1* | 1/2020 | Heiska ................ H04W 52/028 |
| 2022/0337162 A1* | 10/2022 | Shen ..................... H02M 3/156 |
| 2023/0318686 A1* | 10/2023 | Kwak .................... H04B 7/088 455/101 |

OTHER PUBLICATIONS

European Search Report issued for the corresponding European patent application No. 22199770.3, dated Jul. 13, 2023, 9 pages (for informational purposes only).

* cited by examiner

*Primary Examiner* — Joseph E Dean, Jr.
(74) *Attorney, Agent, or Firm* — Viering, Jentschura & Partner mbB

(57) ABSTRACT

A battery-powered device includes a baseband modem, configured to receive or send data according to a first operational mode, wherein the data correspond to a software application being executed on the battery-powered device; and a processor, configured to determine a resource requirement of the software application; and send a signal representing the determined resource requirement to the baseband modem; wherein the baseband modem is further configured to change from the first operational mode to a second operational mode based on the signal.

25 Claims, 9 Drawing Sheets

POWER MANAGEMENT IN BATTERY POWERED COMMUNICATION DEVICE AND METHOD

TECHNICAL FIELD

Various aspects of this disclosure generally relate to power management in battery-operated devices that also include one or more communications functions.

BACKGROUND

Battery operated devices are ubiquitous, and their development is heavily influenced by the desire to have devices that are smaller and more mobile. As a result, there is significant emphasis on the manufacture of ever smaller and more compact battery-operated devices. As the form factor of such devices decreases, their battery size also tends to decrease, and their functions may become limited by their battery capacity. In devices that include a communications function (e.g. devices with a transmitter, receiver, transceiver, etc.), a zero-sum relationship may ensue, in which battery power is directed to one of the application processor(s) or the communications module at the expense of the other. Conventionally, communication modules are configured to maximize their throughput (e.g. by implementing all supported communications resources) such that significant battery resources are directed to the communications module (e.g. for Wireless Wide Area Network (WWAN), Wireless Local Area Network (WLAN), etc.) without respect to the resulting power available for the applications processor(s). As such, the power budget left for the applications processor(s) is significantly reduced, potentially resulting in any of decreased efficiency, slower processing, rapid battery depletion, or diminished user experience.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

Figure 1:
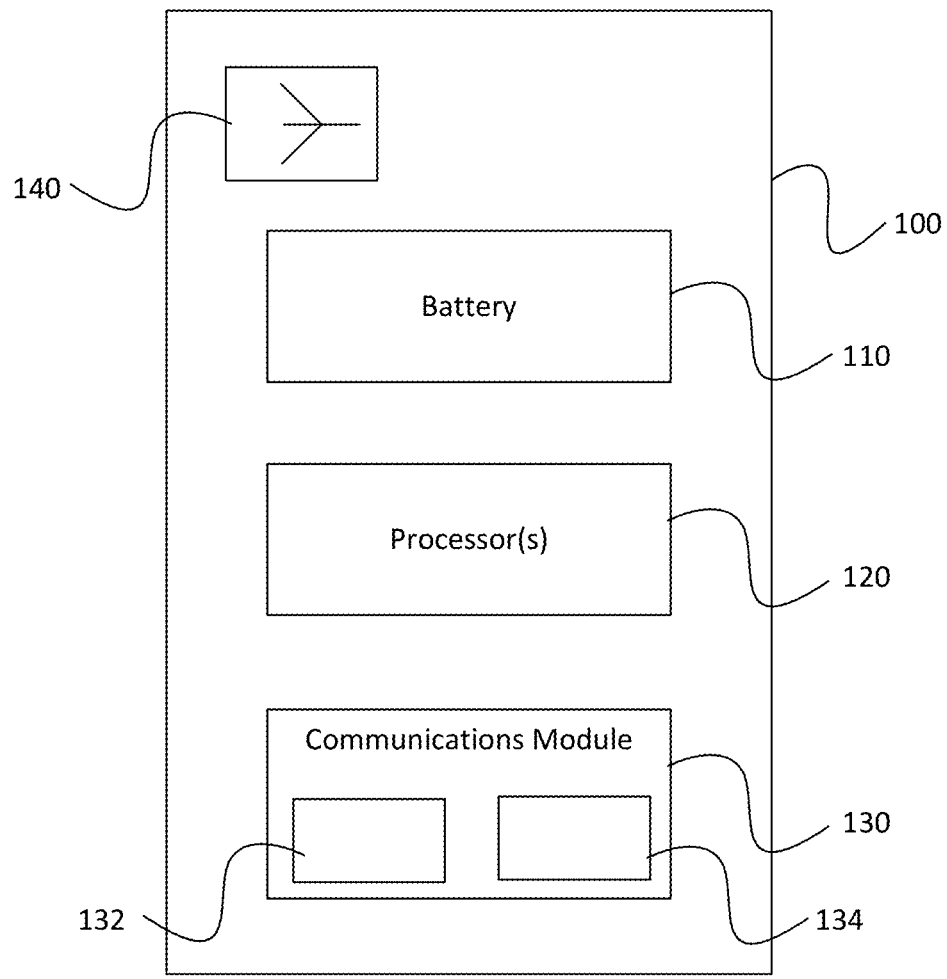
FIG. 1 depicts a battery-powered device, according to an aspect of the disclosure.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

FIG. 1 depicts a battery-powered device 100. The battery-powered device 100 may include a battery 110, one or more processors 120, the communications module 130, and an antenna 140. The battery powered device 100 may be any kind of device that operates partially, occasionally, intermittently, consistently, or any of these, on battery power. That is, the battery-powered device 100 may be a device that is capable of operating entirely on battery power throughout an entire operation cycle from complete battery charge to depleted battery. Additionally or alternatively, the battery-powered device 100 may be a device that is capable of operating via either mains power (e.g. alternating current, or rectified direct current) or from the battery. The battery may be any kind of battery, without limitation.

The battery-powered device 100 may include one or more processors 120, which may be configured to perform one or more processing functions for the battery-powered device 100. The one or more processors are 120 may include one or more application processors, which may be configured to execute instructions of one or more applications (e.g. software). The application processors may be configured to execute instructions for one or more applications. The one or more processors 120 may include, but are not limited to, one or more microprocessors, one or more processors of an integrated circuit, one or more processors of a system on chip, one or more cores, one or more core networks, or otherwise. The battery-powered device 100 may include a communications module 130. The communications module 130 may include a baseband modem 132 and one or more receivers, transmitters, and/or transceivers 134. The baseband modem 132 may be configured to receive one or more electrical signals from the one or more processors 120, wherein the received one or more electrical signals represent data for wireless transmission; modulate the received data, and control the one or more transmitters or transceivers 134 to wirelessly transmit the modulated signals representing the received data via the antenna 140. The baseband modem 132 may be configured to receive one or more signals from the antenna 140, wherein the received signals represent wirelessly transmitted data; demodulate the received one or more signals to determine the wirelessly transmitted data, and send one or more electrical signals representing the wirelessly transmitted data to the one or more processors 120. Because device configurations may differ, the term "communications module" is frequently used herein. The communications module may include a baseband modem (occasionally referred to herein for convenience simply as a "modem"). The communications module may include a transmitter, a receiver, a transceiver, or any of these. The communications module may include one or more antennas (which are depicted separately from the communications module in FIG. 1 but may alternatively be included within the communications module).

According to a first aspect of the disclosure, the battery-powered device of FIG. 1 includes a baseband modem 132, which is configured to receive or send data according to a first operational mode. The data may correspond to a software application being executed on the battery-powered device. The battery powered device of claim 1 includes one or more processors 120, which are configured to determine a resource requirement of the software application and send a signal representing the determined resource requirement to the baseband modem 132, wherein the baseband modem 132 is further configured to change from the first operational mode to a second operational mode based on the signal.

According to a second aspect of the disclosure, the battery powered device of FIG. 1 may optionally be further configured such that the first operational mode includes the baseband modem 132 operating according to a first wireless modulation scheme, and wherein the second operational mode includes the baseband modem operating according to a second wireless modulation scheme, different from the first wireless modulation scheme.

According to a third aspect of the disclosure, and together with any one or more other aspects of the disclosure, the battery-powered device of FIG. 1 may optionally be further configured wherein the wireless modulation scheme is a wireless modulation scheme according to the Modulation Coding Scheme (MCS).

According to a fourth aspect of the disclosure, and together with any one or more other aspects of the disclosure, the battery-powered device of FIG. 1 may optionally be configured such that the first operational mode includes operating with a first wireless throughput, and wherein the second operational mode includes operating with a second wireless throughput, less than the first wireless throughput.

According to a fifth aspect of the disclosure, and together with any one or more other aspects of the disclosure, the battery-powered device of FIG. 1 may optionally be configured wherein the first operational mode includes operating according to a multiple-input-multiple-output ("MIMO") wireless communication protocol, and wherein the second operational mode includes not operating according to a MIMO wireless communication protocol.

According to a sixth aspect of the disclosure, and together with any one or more other aspects of the disclosure, the battery-powered device of FIG. 1 may optionally be configured wherein the first operational mode includes operating according to a MIMO wireless communication protocol using a first number of antennas, and wherein the second operational mode includes operating according to a MIMO wireless communication protocol using a second number of antennas, fewer than the first number of antennas.

According to a seventh aspect of the disclosure, and together with any one or more other aspects of the disclosure, the battery-powered device of FIG. 1 may optionally be configured wherein the resource requirement is a wireless bandwidth required by the application.

According to an eighth aspect of the disclosure, and together with any one or more other aspects of the disclosure, the battery-powered device of FIG. 1 may optionally be configured wherein the resource requirement is a wireless throughput required by the application.

According to a ninth aspect of the disclosure, and together with any one or more other aspects of the disclosure, the battery-powered device of FIG. 1 may optionally be configured wherein the resource requirement is an estimated power available for the processor.

According to an tenth aspect of the disclosure, and together with any one or more other aspects of the disclosure, the battery-powered device of FIG. 1 may optionally be configured wherein the sending the signal representing the determined resource requirement to the baseband modem includes sending the signal via an Application Programming Interface (API).

According to an eleventh aspect of the disclosure, and together with any one or more other aspects of the disclosure, the battery-powered device of FIG. 1 may optionally be configured wherein the processor 120 estimates a resource utilization of the first operational mode and determines whether the first operational mode includes operating with a resource utilization greater than the determined resource requirement; and if the operational mode includes operating with a resource utilization greater than the determined resource requirement, send a signal to the baseband modem 132 representing the determined resource requirement; and if the operational mode includes operating with a resource utilization less than the determined resource requirement, send no signal to the baseband modem representing the determined resource requirement.

According to a twelfth aspect of the disclosure, and together with any one or more other aspects of the disclosure, the battery-powered device of FIG. 1 may optionally be configured wherein determining the resource requirement of the software application includes determining an estimated power requirement for the baseband modem 132 to wirelessly transmit and/or receive data for the software application; and wherein the processor is further configured to: determine the first operational mode of the baseband modem as an estimated power usage of the baseband modem; and determine whether the operational mode includes operating with a resource utilization greater than the determined resource requirement; and if the operational mode includes operating with a resource utilization greater than the determined resource requirement, send a signal to the baseband modem 132 representing the determined resource requirement; and if the operational mode includes operating with a resource utilization less than the determined resource requirement, send no signal to the baseband modem 132 representing the determined resource requirement.

According to an thirteenth aspect of the disclosure, and together with any one or more other aspects of the disclosure, the battery-powered device of FIG. 1 may optionally be configured wherein the signal includes a Modulation and Coding Scheme (MCS) level, an instruction to implement a MIMO protocol, an instruction to discontinue a MIMO protocol, a maximum number of antennas to use in a MIMO protocol, a maximum power usage of the baseband modem, a maximum data transmission speed of the baseband modem, a maximum data reception speed of the baseband modem, an instruction to implement Average Power Tracking (APT), an instruction to implement Envelope Tracking (ET), or any of these.

According to an fourteenth aspect of the disclosure, and together with any one or more other aspects of the disclosure, the battery-powered device of FIG. 1 may optionally be configured wherein the device is a tablet computer, a gaming PC, a smartphone, or an Internet of Things device.

Figure 2:
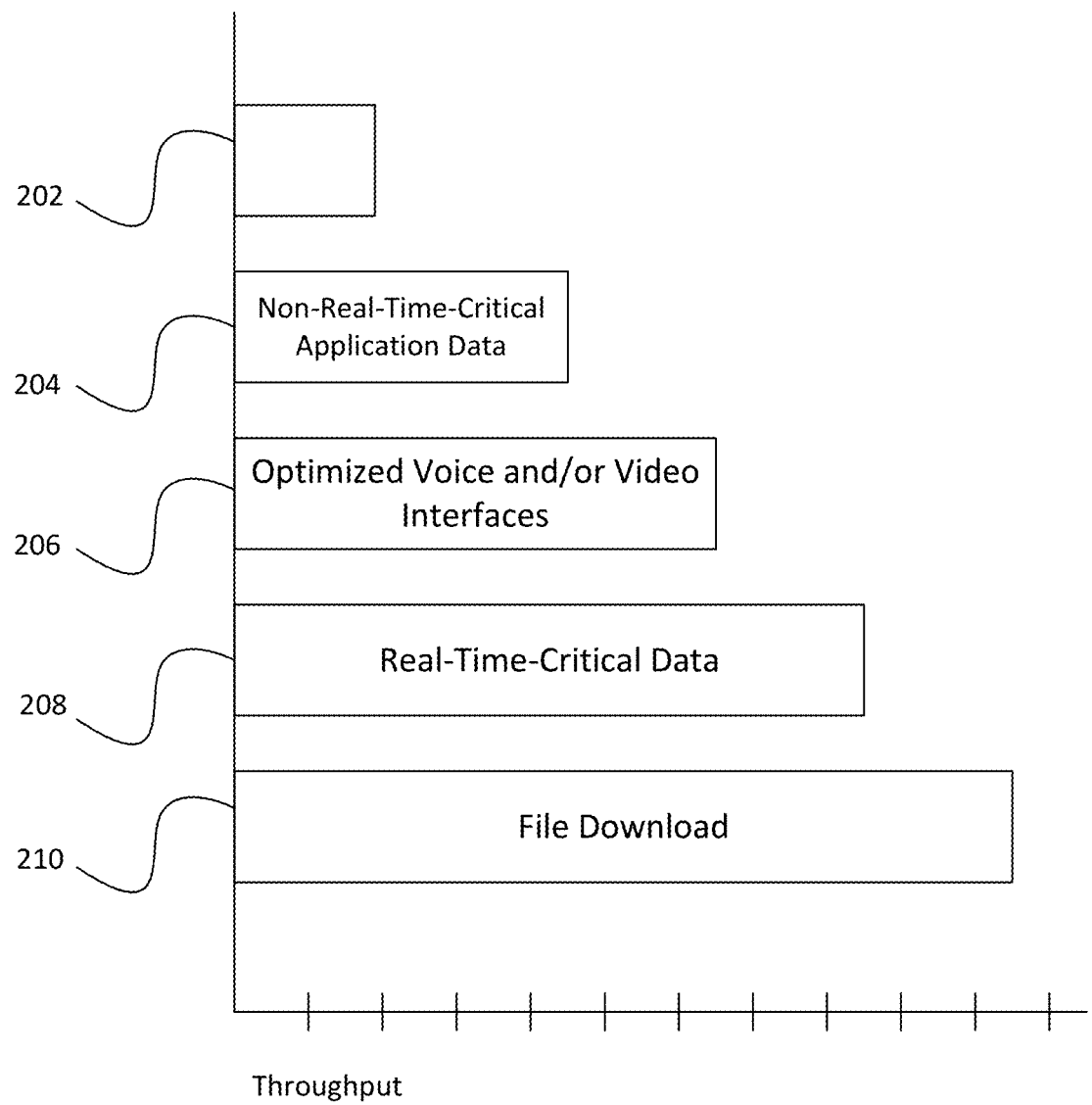
FIG. 2 depicts an exemplary representation of throughput requirements and/or desired throughput for various application tasks.

FIG. 2 depicts an exemplary depiction of throughput requirements and/or desired throughput for various application tasks, for demonstrative purposes. With respect to wireless communication, throughput may generally be understood as the rate of successful message delivery over a communication channel. That is, throughput is the rate at which information is successfully uploaded or downloaded. It may be understood as a successfully delivered quantity relative to a time interval, such as, for example, bits per second (bit/s or bps), data packets per second, data packets per timeslot, or otherwise.

Applications that utilize a communications module for wireless communication may have different throughput requirements based on a particular communications task. As depicted in FIG. 2, applications may engage in low-throughput tasks 202, such as tasks that require short transmissions, infrequent transmissions, transmissions of a high error tolerance, or any of these. Applications may engage in non-real-time-critical application data tasks 204, which may be tasks that require greater throughput than the low-throughput tasks 202, but for which certain delays and/or transmission errors may be acceptable. A non-exclusive list of such tasks may include pinging, acknowledgment/non-acknowledgment transmissions, registrations, periodic check-ins, short transmissions, short receptions, infrequent error-tolerant transmissions, infrequent error-tolerant receptions, and the like. Alternatively, applications may engage in optimized voice and/or video communication, such as through one or more optimized voice and/or video interfaces 206, which may require more throughput than the-application data 204. Many commercial audio and/or videoconferencing interfaces may fall under this category. Such commercial audio and/or videoconferencing interfaces often employ any of a variety of strategies (e.g. video compression, audio compression, buffering, error correction, etc.) to make their services error-tolerant compared to real-time-critical data transmissions. In light of this, such services may provide acceptable-to-good user experience with a lower throughput requirement than a comparable real-time-critical transmission. Alternatively, applications may engage in real-time-critical data uploads or downloads 208, which may be comparatively error-intolerant and may thus require a significant throughput to ensure satisfactory performance. Such real-time-critical data services may include, but are not limited to, Voice over Internet Protocol (VoIP), certain other kinds of digital speech transmission, transmission of high-resolution video, transmission of real-time gaming information, or otherwise. Alternatively, applications may require the ability to upload or download files, even files of quite large sizes (e.g. many megabytes, one or more gigabytes, one or more terabytes, etc.). Such downloads may require a very high throughput, such as to ensure accurate file transfer and/or to quickly complete the upload/download task such that the corresponding resources can then be quickly redirected to other tasks/applications. The representations of application tasks and their corresponding throughput in FIG. 2 are not intended to be depicted to scale, and they are provided for demonstrative purposes only. Applications and/or power-management devices and their corresponding methods according to this disclosure may categorize throughput requirements according to fewer or more categories and/or in different magnitudes than those represented in FIG. 2. Application's throughput requirements may be flexibly tailored to the specific tasks for a given implementation.

Conventionally, it has been considered desirable to maximize throughput of wireless communication, and a variety of strategies are available to increase and/or maximize such throughput. However, in battery-powered devices, and particularly in battery-powered devices with small form factors, increased throughput for wireless communication may occur at the expense of decreased power available for the one or more application processors. Otherwise stated, and using such conventional (e.g. power maximizing) approaches, the power budget remaining for the one or more application processors may be significantly reduced. Still otherwise stated, maximizing throughput often means increasing throughput without respect to a level of throughput actually required by an application. This results in the communications module demanding excess power at the expense of the application processor(s). Decreased or inadequate power to the one or more application processors may result in slower processing times, or reduced battery life, either of which may impair or diminish the user experience. The strategies for managing throughput based on application task requirements, as described herein, represent an improvement over the conventional model by reducing unnecessary power consumption of the communications module such that limited battery resources can be conserved and directed to the one or more application processors. In so doing, it may be possible to satisfy the throughput requirements of a given application task while also increasing processing speed and/or improving user experience, compared to a conventional (e.g. throughput maximizing) implementation.

This may be achieved at least by having the battery-powered device negotiate with a base station or access point to determine a capability it can support based on the application need, rather based on what the communications module can support. Strategies for decreasing power to the communication module include reducing the modulation order (e.g. selecting a computationally simpler modulation scheme, selecting a modulation scheme with a lower MCS index number, etc.), reducing or disabling the carrier aggregation (e.g. reducing a number of component carriers utilized in carrier aggregation), reducing or disabling MIMO, changing a power tracking schema, or any of these.

With respect to modulation schemes, data are transmitted and received wirelessly according to any of a plurality of modulation schemes. For example, a device may employ phase and/or amplitude modulation to more accurately and/or more rapidly transfer/receive data. A non-exhaustive list of modulation schemes for wireless communication includes Binary Phase Shift Keying (BPSK), Quadrature Phase Shift Keying (QPSK), 16-Quadrature Amplitude Modulation (16-QAM), 64-Quadrature Amplitude Modulation (64-QAM), 256-Quadrature Amplitude Modulation (256-QAM), 1024-Quadrature Amplitude Modulation (1024-QAM). Wireless communication devices may multiplex signals along multiple frequencies, such as according to Orthogonal Frequency-Division Multiplexing (OFDM), Orthogonal Frequency-Division Multiple Access (OFDMA), Multi-User Orthogonal Frequency-Division Multiple Access (MU-OFDMA). Each of these modulation and multiplexing technologies is known to the person skilled in the art, and therefore a detailed recitation of these technologies will not be included herein.

Modulation schemes may be categorized according to coding rate. A coding rate may represent a number of bits used to transfer information relative to a number of bits used for error correction. The coding rate may be provided as a fraction, wherein the numerator represents the number of bits of information transfer, and the denominator represents the total number of bits. For example, the coding rate may be expressed as ½ (e.g. one bit of data for every 1 bit of error correction); ¾ (e.g. three bits of data for every 1 bit of error correction), etc.

Modulation schemes may be categorized according to spatial streams, which may represent a number of independent data streams, such as independent data streams used in a MIMO context (e.g. spatial multiplexing). Larger numbers of data streams may represent increased data rates. Conversely, larger data streams also are more susceptible to noise and interference, and are associated with greater power expenditure.

Modulation schemes may be categorized according to channel width. The channel width may represent a size of the channel used, such as, for example, 20 MHz or 40 MHz.

The modulation scheme may be organized according to the Modulation Coding Scheme (MCS) index. The MCS is known in WLAN communication and organizes modulation type, coding rate, spatial streams, channel width, and guard internal (not described above as it is believed to be principally unrelated to power expenditure) into an index. According to an aspect of the disclosure, the index may range from 0 to 9, from 0 to 11, from 0 to 31, or in any other configuration, wherein each index number represents a modulation configuration according to one or more of the above categories (e.g. coding rate, spatial streams, channel width, etc.). The person skilled in the art will be familiar with the MCS and therefore it will not be reproduced here in its entirety. For demonstrative purposes, however, a simplified version of MCS may be understood as:

| MCS Value | Modulation | Code Rate |
|---|---|---|
| 0 | BPSK | 1/2 |
| 1 | QPSK | 1/2 |
| 2 | QPSK | 3/4 |
| 3 | 16QAM | 1/2 |
| 4 | 16QAM | 3/4 |
| 5 | 64QAM | 2/3 |
| 6 | 64QAM | 3/4 |
| 7 | 64QAM | 5/6 |
| 8 | 256QAM | 3/4 |
| 9 | 256QAM | 5/6 |

In this manner, a change of the modulation schedule may be implemented by changing the MCS value. That is, a communication module may select a lower MCS value than it could theoretically support, wherein the lower MCS value corresponds to a throughput required by a given application rather than a maximum supported/possible throughput.

Conventionally, a modulation scheme may be negotiated between devices engaged in wireless communication with one another. The selected modulation scheme may conventionally depend on various factors including device capability (e.g. whether the device is MIMO capable, whether the processor supports specific types of modulation/demodulation), interference, SNR, Received Signal Strength Indicator (RSSI), successful packet delivery, or any of these. Conventionally, communications modules are configured to maximize throughput, which may generally include selecting/negotiating the highest-throughput modulation scheme supported by the underlying hardware and the channel conditions (e.g. SNR, RSSI, etc.).

Carrier aggregation may be generally understood as a strategy to increase the rate of data transmission for a given user. In carrier aggregation, multiple frequency blocks (component carriers) are assigned to a single user. In so doing, the data rate for a given user is increased by the number of frequency blocks are assigned to the user. As carrier aggregation is known, a complete description of carrier aggregation will not be provided herein.

The communication module may be configured to select a carrier aggregation schema (e.g. a number of component carriers to use and/or whether to utilize carrier aggregation) to meet an application's throughput requirements rather than based on a maximum supported carrier aggregation.

Figure 3:
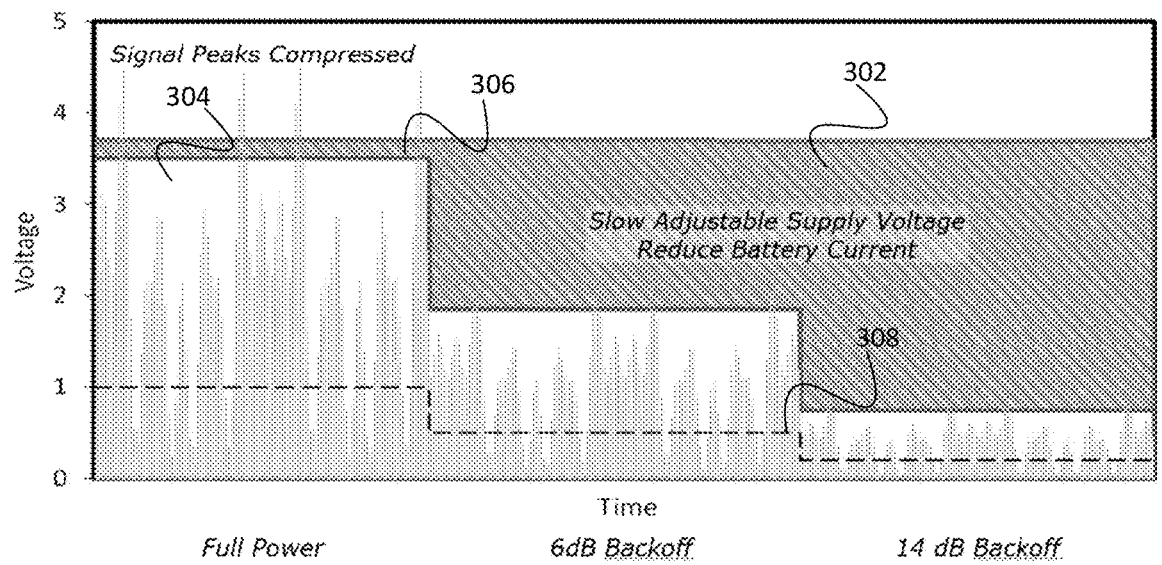
FIG. 3 depicts an Average Power Tracking (APT) Supply Operation.
Figure 4:
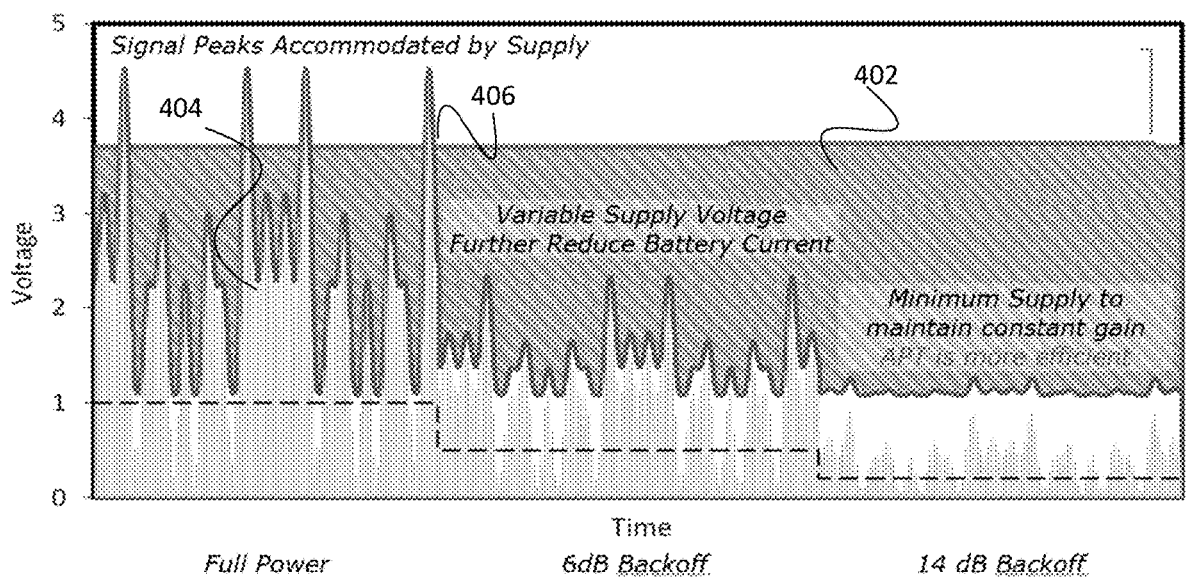
FIG. 4 depicts an Envelope Tracking (ET) Supply Operation.

FIG. 3 and FIG. 4 depict APT and ET Supply Operations, respectively. Most recent cellular devices use either APT or ET to improve efficiency. APT is a known approach to reducing power consumption in radiofrequency power amplifiers. In APT, the communications module dynamically changes the power amplifier supply voltage based on the power amplifier average output power. When the power amplifier output power is less than its maximum output power, the communications module reduces the power amplifier supply voltage. This results in improved power amplifier efficiency. In this manner, the communications module can frequency change the power amplifier supply voltage, as desired, to adjust power consumption.

FIG. 3 depicts a usage of APT to control power consumption. In FIG. 3, the maximum available battery power 302 is depicted as a constant (e.g. although this is subject to depletion, it depletes slowly enough to be represented as constant for demonstrative purposes). The modulated radio frequency signal 304 (e.g. the power amplifier's output) is depicted as having a first (e.g. greatest) average magnitude in the leftmost third of the figure, a second (e.g. moderate) average magnitude in the center third of the figure, and a third (e.g. lowest) average magnitude in the rightmost third of the figure. The communications module modulates the power supplied to the power amplifier 304 according to the power amplifier output. The communications module modules the battery power actually supplied to the power amplifier 306 based on the magnitude of the signal peaks (e.g. the power amplifier's output). The reduction in PAVCC correlates with the PA efficiency in each case.

APT is of less utility, however, in situations of high peak-to-average ratio (PAR) and high average output power, as reduction of the average power to the power amplifier while the power amplifier is operating at full output power will invariably result in decreased linearity. ET uses a dynamic power adjustment that tracks the radiofrequency modulation amplitude (e.g. the instantaneous power output) instead of the average output power level. FIG. 4 depicts an ET power supply. In this figure, the power amplifier does not receive the available battery power 402, but rather, the communications module monitors the instantaneous signal amplitude 404, and the communications module modulates the available power to the power amplifier 406 accordingly. That is, the communications module dynamically adjusts the power supplied to the power amplifier, such as at the speed of 3G/LTE modulation, which allows for the power amplifier's power to be adjusted (optimized). ET may improve efficiency compared to APT in situations of high-modulation and high average output power.

ET tends to be more efficient at higher TX power, whereas APT tends to be more power efficient at lower powers. This may be because, at lower powers, the PA can operate with a lower gain. This is also the reason that the PAs used in cellular devices will also operate in ET mode at higher power and in APT mode a lower power. As a general rule, power levels above 10 to 13 dBm will generally be in ET mode, while power levels below 10 to 13 dBm will typically be in APT mode.

On an average, the baseband modem of the battery-powered device will operate within a range of approximately 0 dBm to 10 dBm. Cellular devices having good RSSI and signal quality will mostly operate in higher order modulations or MCS. When such devices operate at higher-order modulations, the Peak to Average Ratio (PAPR) requirement is also high. This results in higher dissipation of power, as the PA need to be biased not to clip the peaks. In this scenario, if the one or more application processors decide that an application does not require high throughput, the communications module (or more specifically, the baseband modem) can switch to a lower-order modulation scheme. This lower-order modulation scheme reduces overall power consumption. Importantly, this not only reduces the power amplifier's power consumption, but also the processors' power consumption (since lower-order modulation schemes generally require less processing power). The one or more application processors may utilities this now-available power to enhance processor performance.

Communications modules may be configured according to any of a plurality of modulation schemes, any of a plurality of signal strength requirements (e.g. desired Signal to Noise Ratio (SNR), desired RSSI, or the like), or any of a plurality of multiplexing capabilities (e.g. spatial multiplexing versus non-spatial-multiplexing; MIMO communications versus non-MIMO communications). These may each bear on the communication module's power consumption.

There are many applications with modest bandwidth requirements, for which a maximized throughput is unnecessary. For example, many known commercial video conferencing applications use various strategies to provide an acceptable-to-good user experience at significantly less bandwidth than is required in real-time-critical applications. For these video conferencing applications, for example, conventional throughput maximization results in throughput beyond the requirements of the underlying application, and this increased and unnecessary throughput, in turn, represents an unnecessary energy expenditure.

For such applications (e.g. applications requiring modest bandwidth, applications requiring less than maximized bandwidth, etc.), and when the user device is, for example, communicating over WWAN or WLAN, the communications module may advantageously be configured to select a power control option (e.g. a lower than maximum throughput, such that the communications module saves power) rather than attempting to maximize the throughput (e.g. such as selecting a maximum throughput based on SNR or RSSI).

In the following, an example of concurrent video conferencing, content recording, and uploading will be described. The communications module could perform these tasks using a High Power Configuration (CAT4), a High Throughput Low Power (CAT16), or a High Throughput and High Power configuration (5G+LTE). The communications module's configuration may depend on the network condition (e.g., whether the user is in a congested area or whether the user is in a low mobility, a high mobility, or a stationary scenario). Based on the network condition, the communications module could operate its WWAN in a high throughput and high power scenario (e.g., in an ENDC scenario) while also being far away from the base station; however, the average power consumed can be as much as 8.5 W for a sustained scenario, such as for 15-20 minutes. This drains the device's battery. Moreover, the device may have insufficient power in its power budget for its other operations. In such a scenario, the WWAN can select a better power control option rather than continuing to use the present settings. The WWAN can configure itself to low throughput low power conditions (e.g., fall back from an ENDC scenario of 3.51 Gbps to a CAT4 configuration, or to a throughput of 1 Gbps, or even lower to a CAT 4 configuration operating at 300 Mbps). Lower throughput may result in longer times for task completion, compared to times using a maximized throughput; however, the reduced throughput will permit the applications to run for longer durations and to achieve better battery life. Ideally, the communications module may select a reduced throughput that satisfies any throughput requirements of an underlying application while saving sufficient power (due to the reduced throughput) to improve application processor performance.

According to an aspect of the disclosure, the one or more processors may determine an application bandwidth (e.g. a required bandwidth for the application, a preferred bandwidth for the application, etc.) and communicate same to the communications module. The communications module will select a modulation scheme to ensure the application bandwidth (e.g. to meet the application bandwidth requirement, to meet the application bandwidth requirement with a modest buffer, to slightly exceed the application bandwidth requirement). Alternatively or additionally, the communication module may enable, disable, or configure MIMO to meet the application bandwidth requirement.

Figure 5:
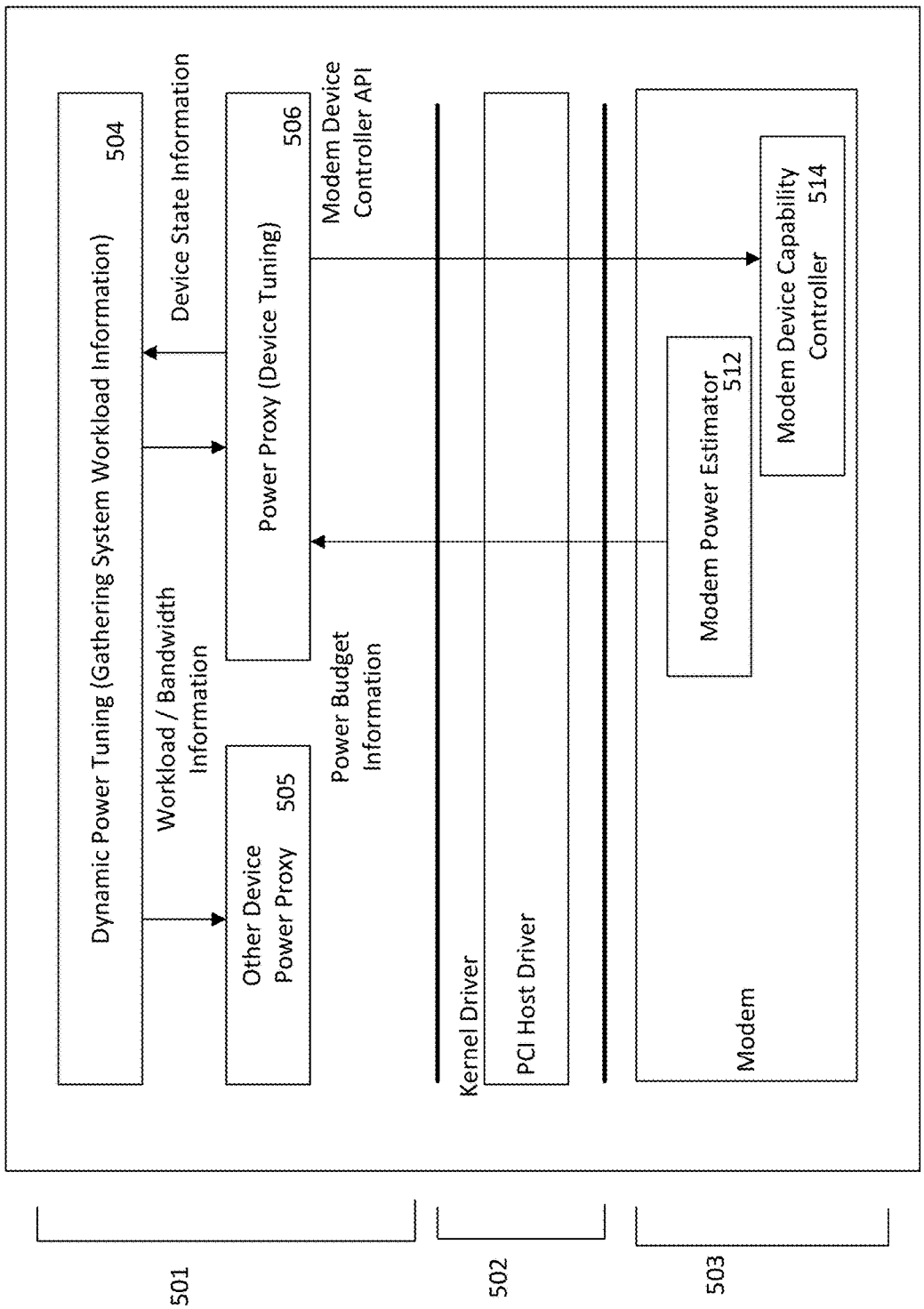
FIG. 5 depicts a high-level architecture of a battery power manager.

Strategies for this power management will be described via the following figures. FIG. 5 depicts a high-level architecture of a battery power manager (e.g. battery power managing device, battery power management hardware, battery power management software) 501. The battery power manager 501 includes a Dynamic Power Tuning Module 504 and a Power Proxy Module 506. The battery power manager 501 communicates with the communications module 503 to manage power, such as via one or more drivers to control the communications module 503, such as a kernel driver and/or the PCI Host Driver 502. In this figure, the modem 503 implements a Modem Power Estimator 512, which monitors the current communications module configurations (e.g. modulation scheme, carrier aggregation, MIMO usage, power tracking, or any of these) in real time. The Modem Power Estimator 512 estimates a power requirement corresponding to the monitored communications module configuration and reports this power requirement to the Power Proxy Module 506.

The Device Power Tuning module 504 within the host application monitors the ongoing system applications and system states. Such power monitoring may include the underlying device itself, as well as any proxy power that must be provided to another (e.g. external) device 505 (e.g. an external storage device, etc.). The Device Power Tuning module 504 may be configured to determine one or more aspects of the current system scenario. This may include the activities performed by one or more applications being executed by the one or more application processors. For example, the Device Power Tuning module 504 may determine whether the device is idle, merely browsing the web, using optimized audio/video communication, using real-time critical communication, downloading files, or otherwise. The Device Power Tuning module 504 reports this determined system status to the Power Proxy Module 506.

Because the Power Proxy Module 506 receives both the system status from the Dynamic Power Tuning Module 504 and the modem power from the Modem Power Estimator 512, the Power Proxy Module 506 may determine from this information whether the Communications Module 503 should reduce the power consumption of its baseband modem. The Power Proxy Module 506 may be configured with one or more values or ranges of baseband modem power relative to a task of the application processor. Although these power ranges are modem-specific and battery-specific, and thus may generally be tailored for a given implementation, an exemplary logic with exemplary values for demonstrative purposes may be as follows:

| Reported Activity | Estimated Power | Preferred Power |
|---|---|---|
| Browsing | 3 W | 500 mW |
| Optimized Video | 6 W | ~2 W |
| Download | 7 W | ~4 W |
| Upload file, stream video, download the files (combinations of all) | 10 W | ~5 to 6 W |

In this way, a Power Proxy Module 506 receiving a report from the Dynamic Power Tuning Module 504 that the system is browsing the web, and receiving a report from the Modem Power Estimator 512 that the baseband modem is averaging 3 W of power, the Power Proxy Module 506 may determine that a power adjustment for the baseband modem is necessary based on a target power usage of 500 mW. The Power Proxy Module 506 may send an instruction to the Modem Device Capability Controller 514 to reduce the baseband modem's power. Alternatively or additionally, the Power Proxy Module 506 may send an instruction to the Modem Device Capability Controller 514 to reduce the baseband modem's power to reach the target of 500 mW.

Similarly, the Power Proxy Module 506 receiving a report from the Dynamic Power Tuning Module 504 that the system is using optimized voice/speech, and receiving a report from the Modem Power Estimator 512 that the baseband modem is averaging 8 W of power, the Power Proxy Module 506 may determine that a power adjustment for the baseband modem is necessary based on a target power usage of 1 W. The Power Proxy Module 506 may send an instruction to the Modem Device Capability Controller 514 to reduce the baseband modem's power. Alternatively or additionally, the Power Proxy Module 506 may send an instruction to the Modem Device Capability Controller 514 to reduce the baseband modem's power to reach the target of 1 W.

Alternatively, the Power Proxy Module 506 receiving a report from the Dynamic Power Tuning Module 504 that the system is downloading files, and receiving a report from the Modem Power Estimator 512 that the baseband modem is averaging 7 W of power, the Power Proxy Module 506 may determine that a power adjustment for the baseband modem is unnecessary.

In each of these examples, the Communications Module 503 receives from the Battery Power Manager 501 an instruction to reduce power and/or a goal for power reduction (e.g. a desired wattage). According to an aspect of the disclosure, it is envisaged that the Communications Module 503 determines the specific changes to achieve the reduced power consumption (e.g. a change in modulation, reduction of component carriers, disabling of MIMO, etc.).

According to an aspect of the disclosure, the instruction sent from the Power Proxy Module 506 may be described as an instruction (e.g. an electrical signal) representing a resource requirement. In this manner, the resource requirement may be understood as a particular power requirement of an application (e.g. the third column, above) and/or the signal representing the resource requirement may more simply be a signal to inform the Modem Device Capability Controller 514 to reduce the baseband modem's power usage, such as to more closely match a power requirement (e.g. as shown in the third column).

The communications module 503 may implement any of a variety of mechanisms to reduce the device's run time, such as by reducing a number of power configurations supported (e.g. change configuration to reduce power demand), reducing the uplink throughput, discontinuing use of an E-UTRAN New Radio—Dual Connectivity (ENDC) scenario to LTE only, reducing the transmit power of the communications module, or any of these. The communications module provides different capabilities/interfaces to reduce the communications module capabilities in real time. These run time (e.g. real time) reductions can reduce the total power consumption by the communications module without diminishing the user experience, while still achieving the application's processing requirement. These API/interfaces are already supported on current WWAN modules.

Throughout this disclosure, the Communications Device's 503 settings reported to the Power Proxy 506 by the Modem Power Estimator 512 (e.g. modulation, carrier aggregation, MIMO, etc.) may be described as operating according to a first operational mode. The Communications Device's 503 setting changes that occur in response to an instruction from the Power Proxy Module 506 to reduce a power consumption of the baseband modem may be described as a second operational mode.

Figure 6:
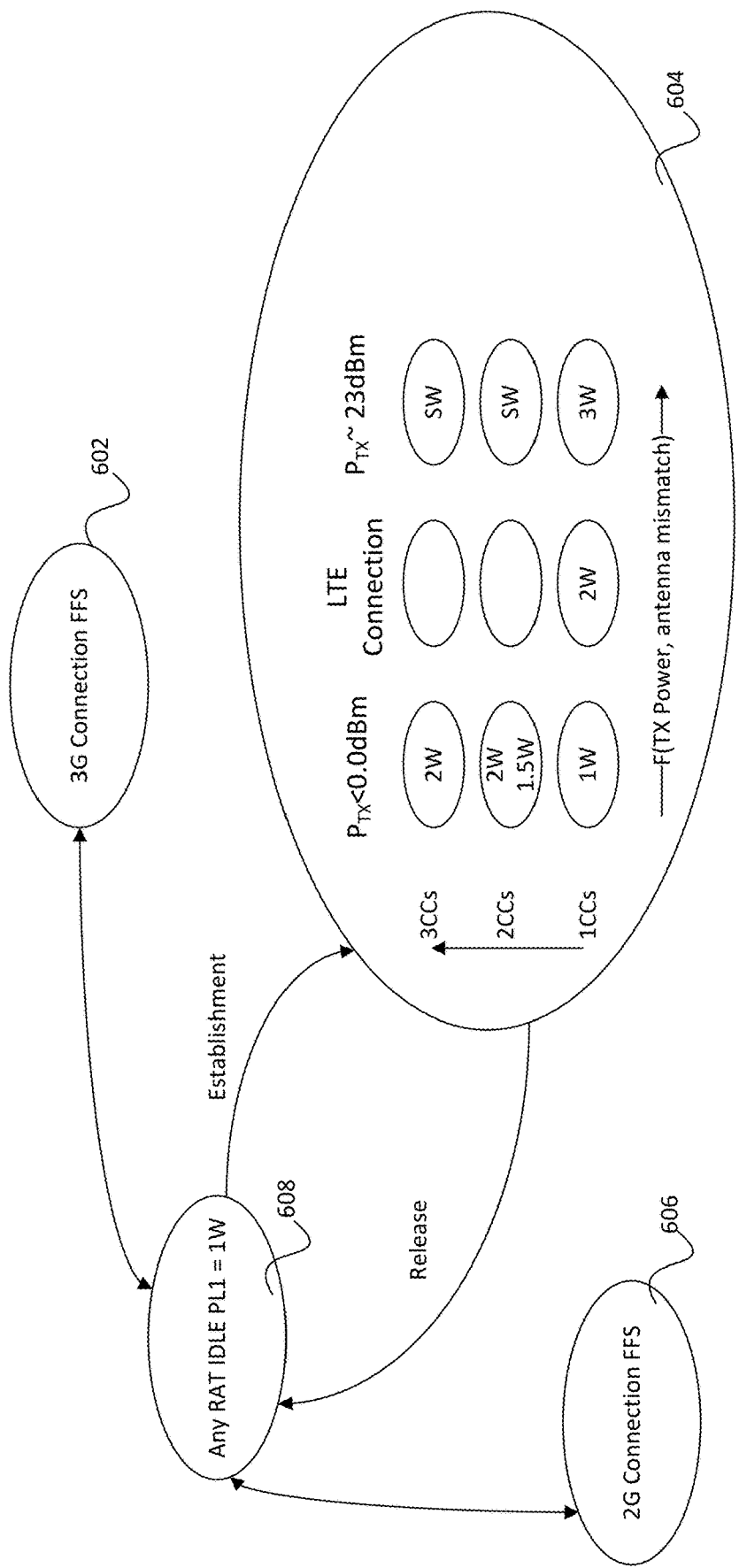
FIG. 6 depicts a software management of the system resources, as performed by the Modem Power Estimator.

FIG. 6 depicts in greater detail a software management of the system resources, as performed by the Modem Power Estimator 512. That is, FIG. 6 depicts a high-level software architecture and interfaces to achieve functions of the Modem Power Estimator 512.

Both (1) a distance between the baseband modem and the network's base station and (2) the overall network capabilities, such as the type of connection (e.g. 2G, LTE, etc.), type of modulation, whether MIMO is used, and an extent of carrier aggregation used, may factor heavily in the estimation of the communications module's power requirements. The Modem Power Estimator 512 may monitor the communications module and the corresponding network capabilities to estimate a communications module's power requirements. The Modem Power Estimator 512 may estimate the communications module's power requirements occasionally, intermittently, periodically, or constantly. The Modem Power Estimator 512 may repeatedly perform this estimation function and report the relevant power budget requirements.

According to one aspect of the disclosure, the Modem Power Estimator 512 may estimate the communications module power based on at least wireless connection type (e.g. a Radio Access Technology (RAT) such as 2G, 3G, LTE, etc.) and transmission power. In this exemplary configuration, the Modem Power Estimator 512 may select a schema (e.g. a table or other relationship of values) based on the RAT (depicted generally as selecting a schema based on a 3G connection 602, and LTE connection 604, or a 2G connection 706). The schema relative to the LTE connection 604 is depicted in greater detail for demonstrative purposes in FIG. 6. With respect to the LTE connection 604, Modem Power Estimator 512 may estimate the communications module power values based on, for example, a relationship of transmission power relative to a number of component carriers for a carrier aggregation function. In this case, and as an example, and assuming use of a single component carrier, the predicted communications module power requirement would range between 1 W and 3 W, based on the respective transmission power. In this case, a transmission power of less than 0 dBm may be associated with a communications module power of 1 W, and a transmission power of approximately 23 dBm may be associated with a communications module power of 3 W. It is expressly noted that the values that are included in FIG. 6 are provided for demonstrative purposes only, and the specific values may be tailored or selected based on the given implementation. In this example, the communications module power estimation is characterized by a 3×3 (e.g. 3 columns and 3 rows) schema; however, any number of columns and rows may be utilized. According to an aspect of the disclosure, each RAT supported by the communications module may have its own respective schema (e.g. including a particular number of columns and rows) with communications module power estimation values associated with that RAT. Upon determining an estimated power as depicted in FIG. 6, the Modem Power Estimator 512 may provide this estimated communications module power requirement to the Power Proxy Module 506. The data for these power estimations may be configured as a look up table, a matrix, one or more sliding scales, or in any other data configuration. Although a detailed schema is only provided for an LTE connection 604, the same can be performed with respect to a 3G connection 602, a 2G connection 606, or any other RAT connection.

Should the RAT be idle when the estimation occurs, then it may not be beneficial to select a particular schema for a specific RAT, but rather it may be beneficial to estimate a power requirement based on RAT idleness (e.g. all idle RATs could theoretically be assigned the same estimated power requirement). As an example in FIG. 6, an idle RAT will be assigned an estimated power requirement of 1 W 608.

Figure 7:
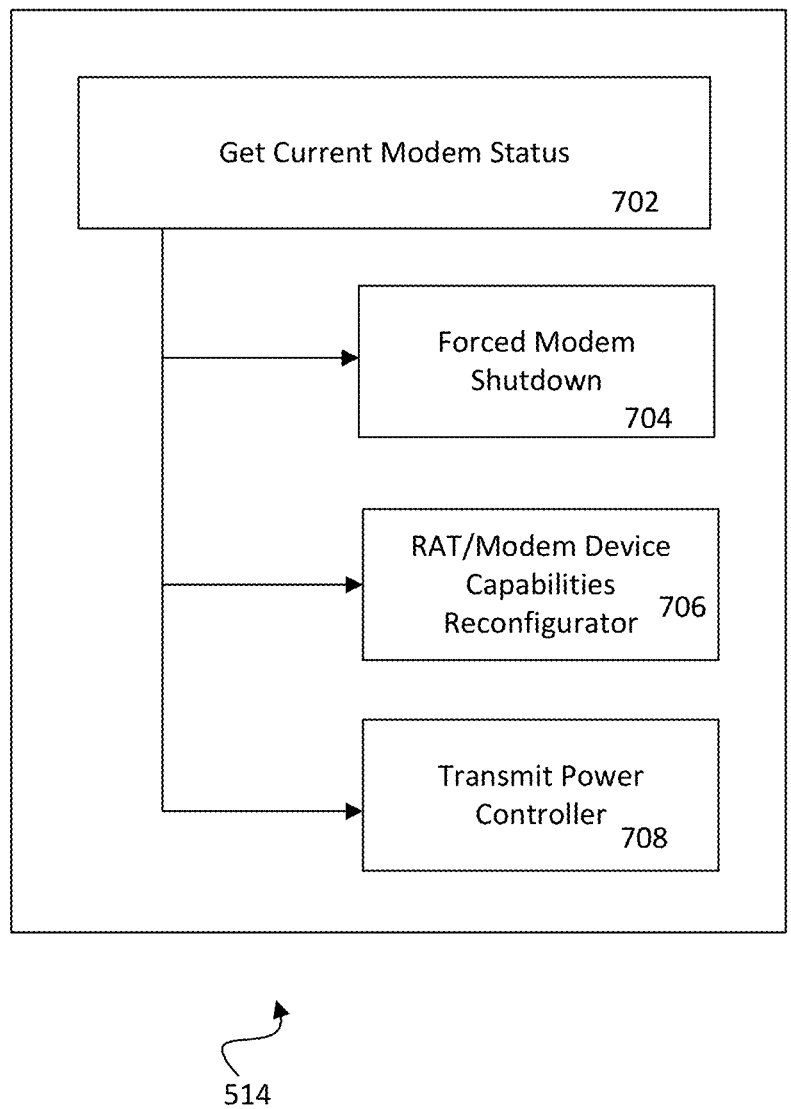
FIG. 7 depicts a more detailed determination of the Modem Device Capability Controller, according to an aspect of the disclosure.

FIG. 7 depicts a more detailed depiction of the Modem Device Capability Controller 514, according to an aspect of the disclosure. As described above, the Modem Power Estimator 512 monitors the current communications module configurations in real time and reports the power requirement to the Power Proxy Module 506. The Modem Power Estimator 512 may provide this information through any available hardware or software interface. The host application 501 monitors the ongoing system applications and system states. If the host needs to reduce the power budget allocation to the communications module, it reports this need to the Power Proxy Module 506, which in turn notifies the Modem Device Capability Controller 514.

The Modem Device Capability Controller 514 may be configured to obtain a current communications module status 702. It may be configured to alter the current communications module status (e.g. reduce or increase communications module power usage), such as by performing a forced communications module shutdown 704, by reconfiguring any of the RAT and/or communications module device capabilities 706, or by controlling the transmit power 708.

With respect to the forced communications module shutdown 704, the Modem Device Capability Controller 514 may understand from the Power Proxy Module 506 that the underlying application has no need to wirelessly transmit or receive data, and therefore the Modem Device Capability Controller 514 may shut down the communications module 704. Additionally or alternatively, the Modem Device Capability Controller 514 may independently make this determination. Communications module shutdown may include, but is not limited to, placing the communications module in idle mode, placing the communications module in standby mode, or disabling power to the communications module.

With respect to the RAT/modem device capabilities reconfigurator 806, the Modem Device Capability Controller 514 may be configured to control the communications module to enable or disable one or more functions associated with the RAT. For example, the Modem Device Capability Controller 514 may increase or decrease a number of component carriers for carrier aggregation, enable or disable carrier aggregation, enable or disable MIMO (e.g. spatial multiplexing) transmission or reception, change the modulation schema (e.g. change an MCS value, change a modulation type, change a code rate, etc.), reduce an uplink throughput, discontinue ENDC and operate instead using conventional LTE, or any of these.

With respect to the transmit power controller 708, the Modem Device Capability Controller 514 may be configured to control the communications module to increase or decrease its transmit power. This may include setting a maximum transmit power, changing a power tracking schema (e.g. switching from ATP to ET or vice versa), or any of these. Such run time reduction can reduce the total power consumption by the communications module without affecting the user experience and can thus also satisfy the application's power requirement. Communications modules generally include various APIs and/or interfaces that can be used to reconfigure the above parameters and any such APR and/or interface may be used.

Figure 8:
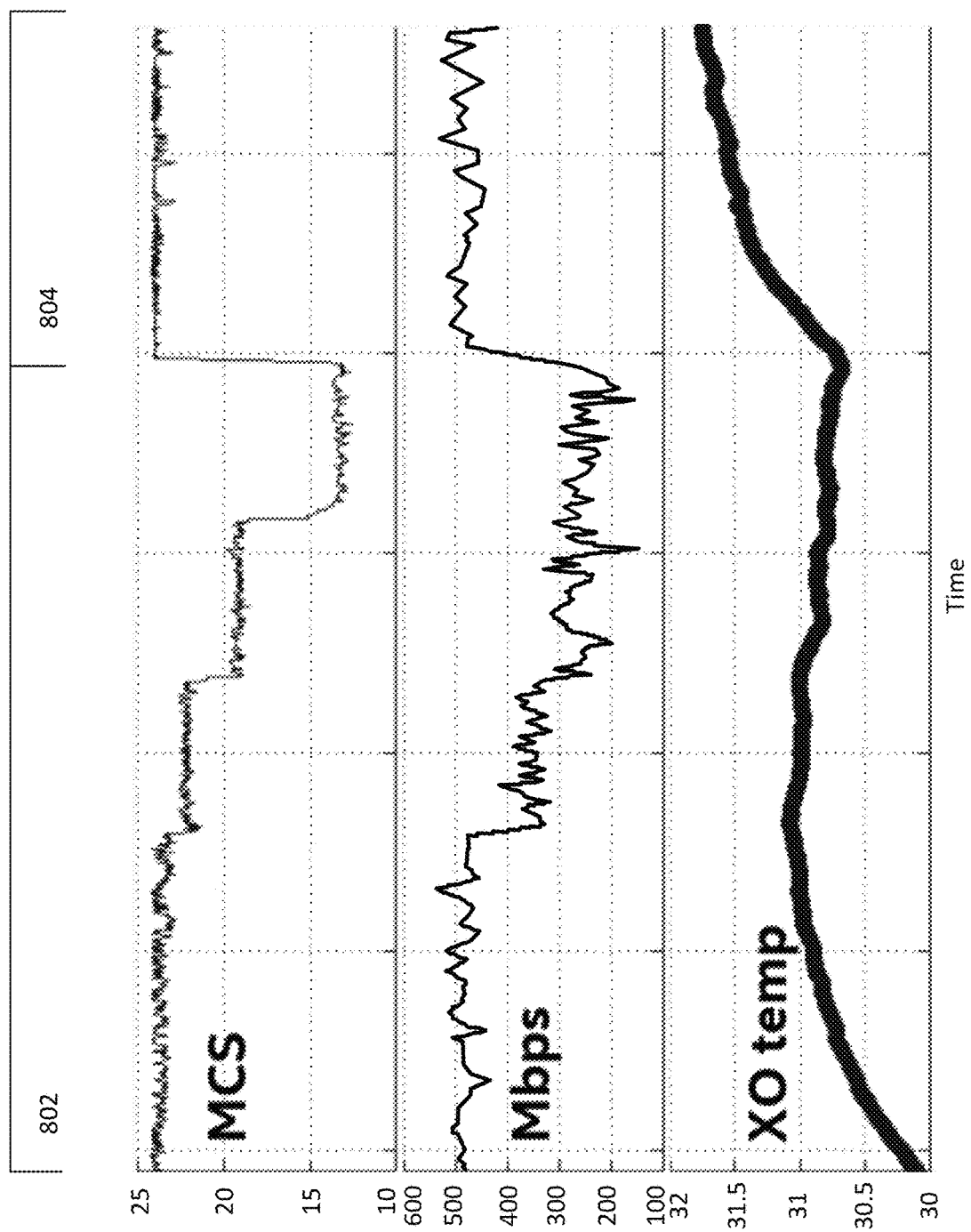
FIG. 8 depicts a comparison of MCS, throughput, and temperature.

FIG. 8 depicts a comparison of MCS, throughput, and temperature, as performed on a communications module operating with up to 5 aggregated carriers, at 64QAM. The primary cell had a Reference Signal Received Power (RSRP) of −115 dBm, and the secondary cell had a RSRP of −113 dBm. The signal-to-noise ratio was between 14 dB and 17 dB. There was full downlink allocation on all cells. This comparison represents throttling test, in which the communications module was operated at full or regular capacity, and then throttled on 3 subsequent levels. The first throttling level (slight throttling) represents a 30% throughput reduction and an 8% current reduction. The second throttling level (severe throttling) represents a 47% throughput reduction and a 14% current reduction. The third throttling level (aggressive thought of laying) represents a 50% throughput reduction and an 18% current reduction. Note that these levels and corresponding values are selected for demonstrative purposes, and the concepts disclosed herein may be implemented on more or fewer than 3 throttling levels, and each of the throttling levels may correspond to other values than those provided herein, as would be selected for a given implementation.

In this figure, the MCS begins at high throughput, with an MCS of approximately 24. The throughput is decreased in a stepwise fashion throughout the period indicated by 802 by implementing slight throttling (corresponding to an MCS of approximately 23), followed by severe throttling corresponding to an MCS of approximately 19), followed by aggressive throttling (corresponding to an MPS of approximately 13). At the beginning of the interval indicated by 804, the throttling is discontinued, and the MCS increases from its low of approximately 13 to approximately 24. The throughput largely tracks the changes in MCS, such that the throughput is approximately 500 Mbps while the MCS is at approximately 24. With each stepwise decrease of the MCS throughout interval 802, the throughput is consequently diminished, dropping to approximately 350 Mbps, then to approximately 380 Mbps, and finally to approximately 250 Mbps. As the MCS increases to approximately 24 at the beginning of interval 804, the throughput increases rapidly to approximately 500 Mbps. The third row represents the crystal oscillator temperature, which may be indicative of average communications module power over a duration of time. In this case, the temperature increases from its initial value at the beginning of 802 until the MCS begins its stepwise reduction, at which time the temperature similarly begins to decrease. At the beginning of interval 804, the temperature suddenly increases. Based on this, although a higher MCS may be understood as increasing spectral efficiency, a higher MCS may represent a reduction of power efficiency, compared to that associated with a lower MCS. The same is believed to be true of MIMO usage, in which the implementation of MIMO increases spectral efficiency but is associated with a decrease in power efficiency.

FIG. 8 demonstrates the benefit of selecting MCS (e.g. selecting an MCS index number, selecting a modulation schema, etc.) and whether to use MIMO based on the application's requirements, rather than on the communications module's capabilities. Otherwise stated, the selection of a modulation schema that results in greater throughput, rather than that which is required by the underlying application, may render the communications module's performance power inefficient. Otherwise stated, unnecessary throughput demands greater than necessary power resources, thereby depleting the processor of power resources from which its performance might otherwise benefit. This is also true of MIMO usage, in that the use of MIMO may render the communications module spectrally efficient, but the use of MIMO may require additional power resources that may be more beneficially directed to the application processor.

According to an aspect of the disclosure, this may be particularly true in battery-powered devices with small form factors. In such devices, higher communications module power is closely associated with decreased system performance. Thus, in such devices, improving system performance may necessarily require a reduction in communications module power. Because many applications require less throughput than would conventionally be available through regular communications module optimization practices, overall system of performance may be enhanced by configuring the communications module power based unnecessary throughput for an underlying application rather than using the conventional methods of determining communications module power based on communications module capability (e.g. features supported by the communications module).

The following is a demonstrative example of a system use case including concurrent video conferencing, content recording, and office productivity scenarios with WWAN enabled.

| Usecase | Description | WWAN Category | WWAN Usecare Description (23 db) | Thermal Dissipation at 105 die temp |
|---|---|---|---|---|
| DOROTHY9_9W_UP4_Deltachable & Dorothy_9W_UP4_Ultrabook & Dorothy_15W_UP3 | Concurrent video conference + content record + office productivity + download. Skype * desktop v8 2way 1080 Call + Office Productivity + Download Skype Records (WiFi Server -> TBT3 External SSD) | Usecase_1_HighPow | LTE cat 4 150/50 Mbps (LTE FDD, UDP, 20 MHz, 23 dBm, Band 4) | 4.8 |
| | | High TPUT_LowPow | LTE cat 16 980/150 (LTE FEE, DL-5CA 256QAM, UL-2CA 64QAM, UDP, 23 dBm, Band 3A-7C-28A-20A) | 6 |
| | | High TPUT_2_High Pow | ENDC: 5GNR(Higher) Max DL + LTE(Lower) MAX DL with Corresponding 5GN R(Higher) MAX UL + LTE(Lower) MAX UL [MTK:DL: 3.51 Gbs (NR DL: 2.3 Gbps + LTE 1.2 GBPS), Uplink: 150 Mbps (LTE 150 Mbps); 2020/2E | 8.5 |

Figure 9:
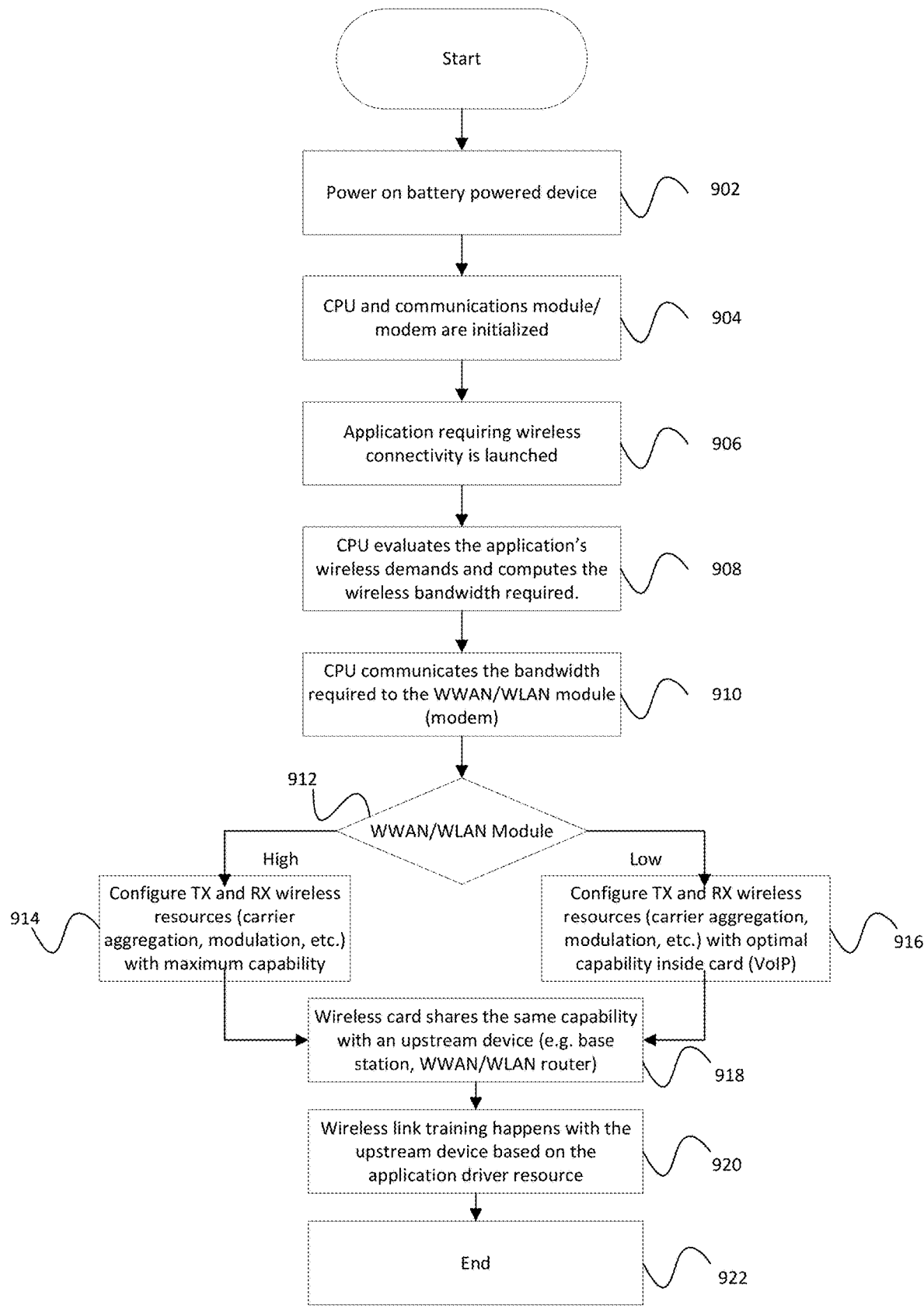
FIG. 9 depicts a flow chart for power management, according to an aspect of the disclosure.

FIG. 9 depicts a flow chart for power management, according to an aspect of the disclosure. In this figure, the battery power device is powered on 902. The one or more processors and communications module/modem are initialized 904. An application requiring a degree of wireless connectivity is launched 906. The one or more processors will then evaluate the application's wireless demands and, from this evaluation, calculate the wireless bandwidth required 908. The one or more processors may communicate the required bandwidth to the WWAN/WLAN module 910. The WWAN/WLAN module 912 implements communications module configurations based on the required bandwidth. For example, if the required bandwidth is high, then the module may configure the transmit and receive wireless resources (e.g. carrier aggregation, modulation, etc.) with maximum capability 914. If the required bandwidth is low, the module may configure the transmit and receive wireless resources (e.g. carrier aggregation, modulation, etc.) with optimal capacity 916. In this case, optimal capacity may refer to a reduced capacity (e.g. non-excessive capacity) that satisfies the requirements of the underlying application without providing access throughput beyond the application's requirements. The wireless card may share the capability with an upstream device such as a base station, a WWAN/WLAN router, etc. 918. Wireless link training may occur with the upstream device based on the application driver resources 920.

Figure 10:
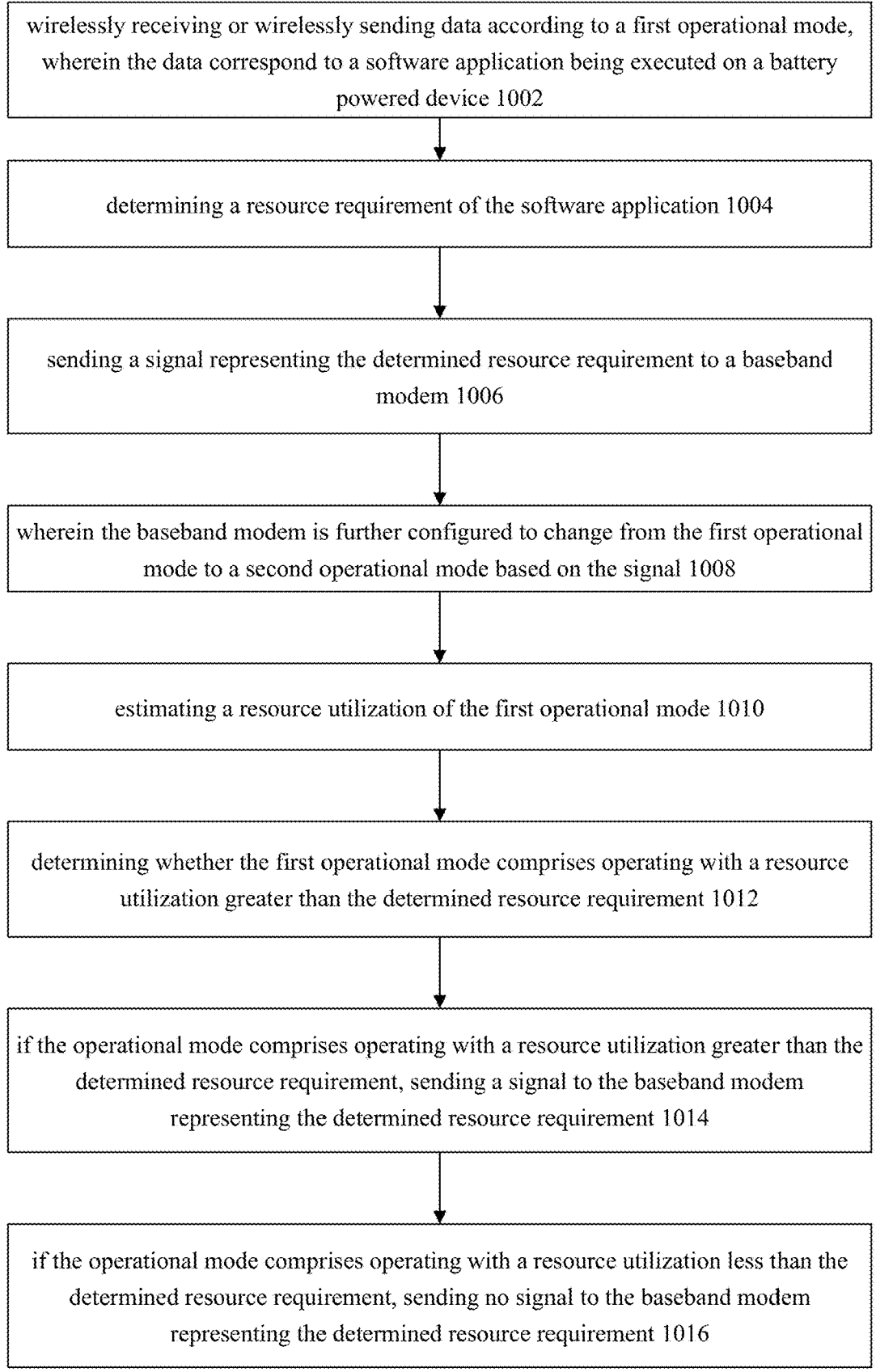
FIG. 10 depicts a method of battery power management, according to an aspect of the disclosure.

FIG. 10 depicts a method of battery power management, according to an aspect of the disclosure. The method may include wirelessly receiving or wirelessly sending data according to a first operational mode, wherein the data correspond to a software application being executed on a battery powered device 1002; determining a resource requirement of the software application 1004; and sending a signal representing the determined resource requirement to a baseband modem 1006; wherein the baseband modem is further configured to change from the first operational mode to a second operational mode based on the signal 1008. The method may further optionally include estimating a resource utilization of the first operational mode 1010; determining whether the first operational mode includes operating with a resource utilization greater than the determined resource requirement 1012; if the operational mode includes operating with a resource utilization greater than the determined resource requirement, sending a signal to the baseband modem representing the determined resource requirement 1014; and if the operational mode includes operating with a resource utilization less than the determined resource requirement, sending no signal to the baseband modem representing the determined resource requirement 1016.

According to an aspect of the disclosure, the wireless communications module may be configured to select configurations (modulation, MIMO, carrier aggregation, etc.) to achieve a desired wireless communications module power usage that corresponds to a throughput requirement for the underlying application. The desired wireless communications module power usage may be a power usage of a plurality of predetermined power usage levels. For example, the wireless communications module may be configured to operate its baseband modem at 500 mW, 1 W, 1.5 W, 2 W, 2.5 W, 3 W, 3.5 W, 4 W, 4.5 W, or 5 W.

According to an aspect of the disclosure, a wireless communications module may be configured to operate its baseband modem at 500 mW to 1 W for optimized video conferencing.

According to an aspect of the disclosure, the wireless communications module may be configured to select configurations (modulation, MIMO, carrier aggregation, etc.) to achieve a desired wireless communications module throughput that corresponds to a throughput requirement for the underlying application. The desired wireless communications module throughput may be a throughput of a plurality of predetermined throughput levels. For example, the wireless communications module may be configured to operate its baseband modem at 100 kbps, 200 kbps, 300 kbps, 400 kbps, 500 kbps, 600 kbps, 700 kbps, 800 kbps, 900 kbps, or 1 Mbps.

According to an aspect of the disclosure, a wireless communications module may be configured to operate its baseband modem at 100 kbps for optimized video conferencing.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

In the following, aspects of the disclosure will be described by way of example.

In Example 1, a battery-powered device, including a baseband modem, configured to receive or send data according to a first operational mode, wherein the data correspond to a software application being executed on the battery-powered device; and a processor, configured to determine a resource requirement of the software application; and send a signal representing the determined resource requirement to the baseband modem; wherein the baseband modem is further configured to change from the first operational mode to a second operational mode based on the signal.

In Example 2, the battery-powered device of Example 1, wherein the first operational mode includes the baseband modem operating according to a first wireless modulation scheme, and wherein the second operational mode includes the baseband modem operating according to a second wireless modulation scheme, different from the first wireless modulation scheme.

In Example 3, the battery-powered device of Example 2, wherein the wireless modulation scheme is a wireless modulation scheme according to the Modulation Coding Scheme (MCS).

In Example 4, the battery-powered device of any one of Examples 1 to 3, wherein the first operational mode includes operating with a first wireless throughput, and wherein the second operational mode includes operating with a second wireless throughput, less than the first wireless throughput.

In Example 5, the battery-powered device of any one of Examples 1 to 3, wherein the first operational mode includes operating according to a MIMO wireless communication protocol, and wherein the second operational mode includes not operating according to a MIMO wireless communication protocol.

In Example 6, the battery-powered device of any one of Examples 1 to 3, wherein the first operational mode includes operating according to a MIMO wireless communication protocol using a first number of antennas, and wherein the second operational mode includes operating according to a MIMO wireless communication protocol using a second number of antennas, fewer than the first number of antennas.

In Example 7, the battery-powered device of any one of Examples 1 to 6, wherein the resource requirement is a wireless bandwidth required by the application.

In Example 8, the battery-powered device of any one of Examples 1 to 6, wherein the resource requirement is a wireless throughput required by the application.

In Example 9, the battery-powered device of any one of Examples 1 to 6, wherein the resource requirement is an estimated power available for the processor.

In Example 10, the battery-powered device of any one of Examples 1 to 8, wherein the sending the signal representing the determined resource requirement to the baseband modem includes sending the signal via a Wireless Wire Area Network (WWAN) Application Programming Interface (API).

In Example 11, the battery-powered device of any one of Examples 1 to 9, wherein the processor is further configured to estimate a resource utilization of the first operational mode; and determine whether the first operational mode includes operating with a resource utilization greater than the determined resource requirement; and if the operational mode includes operating with a resource utilization greater than the determined resource requirement, send a signal to the baseband modem representing the determined resource requirement; and if the operational mode includes operating with a resource utilization less than the determined resource requirement, send no signal to the baseband modem representing the determined resource requirement.

In Example 12, the battery-powered device of any one of Examples 1 to 10, wherein determining the resource requirement of the software application includes determining an estimated power requirement for the baseband modem to wirelessly transmit and/or receive data for the software application; and wherein the processor is further configured to: determine the first operational mode of the baseband modem as an estimated power usage of the baseband modem; and determine whether the operational mode includes operating with a resource utilization greater than the determined resource requirement; and if the operational mode includes operating with a resource utilization greater than the determined resource requirement, send a signal to the baseband modem representing the determined resource requirement; and if the operational mode includes operating with a resource utilization less than the determined resource requirement, send no signal to the baseband modem representing the determined resource requirement.

In Example 13, the battery-powered device of any one of Examples 1 to 11, wherein the signal includes a Modulation and Coding Scheme (MCS) level, an instruction to implement a MIMO protocol, an instruction to discontinue a MIMO protocol, a maximum number of antennas to use in a MIMO protocol; a maximum power usage of the baseband modem, a maximum data transmission speed of the baseband modem, a maximum data reception speed of the baseband modem, an instruction to implement APT, an instruction to implement ET, or any of these.

In Example 14, the battery-powered device of any one of Examples 1 to 12, wherein the device is a tablet computer, a gaming PC, a smartphone, or an Internet of Things device.

In Example 15, a processor, configured to: determine a resource requirement of a software application; determine an operational mode of a baseband modem receiving or transmitting data corresponding to the software application; determine whether the operational mode includes operating with a resource utilization determined resource requirement; and if the operational mode includes operating with a resource utilization greater than the determined resource requirement, send a signal to the baseband modem, the signal representing the determined resource requirement to the baseband modem;

In Example 16, a baseband modem, configured to: send or receive data corresponding to an application operating on a device, according to a first operational mode; receive a signal from the device, the signal representing a resource requirement of the application; change operation from the first operational mode to a second operational mode based on the determined resource requirement.

In Example 17, a method of battery power management, including: wirelessly receiving or wirelessly sending data according to a first operational mode, wherein the data correspond to a software application being executed on a battery powered device; determining a resource requirement of the software application; and sending a signal representing the determined resource requirement to a baseband modem; wherein the baseband modem is further configured to change from the first operational mode to a second operational mode based on the signal.

In Example 18, the method of battery power management of Example 17, wherein the first operational mode includes the baseband modem operating according to a first wireless modulation scheme, and wherein the second operational mode includes the baseband modem operating according to a second wireless modulation scheme, different from the first wireless modulation scheme.

In Example 19, the method of battery power management of Example 18, wherein the wireless modulation scheme is a wireless modulation scheme according to the Modulation Coding Scheme (MCS).

In Example 20, the method of battery power management of any one of Examples 17 to 19, wherein the first operational mode includes operating with a first wireless throughput, and wherein the second operational mode includes operating with a second wireless throughput, less than the first wireless throughput.

In Example 21, the method of battery power management of any one of Examples 17 to 19, wherein the first operational mode includes operating according to a MIMO wireless communication protocol, and wherein the second operational mode includes not operating according to a MIMO wireless communication protocol.

In Example 22, the method of battery power management of any one of Examples 17 to 19, wherein the first operational mode includes operating according to a MIMO wireless communication protocol using a first number of antennas, and wherein the second operational mode includes operating according to a MIMO wireless communication protocol using a second number of antennas, fewer than the first number of antennas.

In Example 23, the method of battery power management of any one of Examples 17 to 22, wherein the resource requirement is a wireless bandwidth required by the application.

In Example 24, the method of battery power management of any one of Examples 17 to 22, wherein the resource requirement is a wireless throughput required by the application.

In Example 25, the method of battery power management of any one of Examples 17 to 23, wherein the resource requirement is an estimated power available for the processor.

In Example 26, the method of battery power management of any one of Examples 17 to 25, wherein the sending the signal representing the determined resource requirement to the baseband modem includes sending the signal via a Wireless Wire Area Network (WWAN) Application Programming Interface (API).

In Example 27, the method of battery power management of any one of Examples 17 to 26, further including estimating a resource utilization of the first operational mode; determining whether the first operational mode includes operating with a resource utilization greater than the determined resource requirement; and if the operational mode includes operating with a resource utilization greater than the determined resource requirement, sending a signal to the baseband modem representing the determined resource requirement; and if the operational mode includes operating with a resource utilization less than the determined resource requirement, sending no signal to the baseband modem representing the determined resource requirement.

In Example 28, the method of battery power management of any one of Examples 17 to 27, wherein determining the resource requirement of the software application includes determining an estimated power requirement for the baseband modem to wirelessly transmit and/or receive data for the software application; further including: determining the first operational mode of the baseband modem as an estimated power usage of the baseband modem; determining whether the operational mode includes operating with a resource utilization greater than the determined resource requirement; if the operational mode includes operating with a resource utilization greater than the determined resource requirement, send a signal to the baseband modem representing the determined resource requirement; and if the operational mode includes operating with a resource utilization less than the determined resource requirement, send no signal to the baseband modem representing the determined resource requirement.

In Example 29, the method of battery power management of any one of Examples 17 to 28, wherein the signal includes a Modulation and Coding Scheme (MCS) level, an instruction to implement a MIMO protocol, an instruction to discontinue a MIMO protocol, a maximum number of antennas to use in a MIMO protocol; a maximum power usage of the baseband modem, a maximum data transmission speed of the baseband modem, a maximum data reception speed of the baseband modem, an instruction to implement APT, an instruction to implement ET, or any of these.

In Example 30, the method of battery power management of any one of Examples 17 to 29, wherein the device is a tablet computer, a gaming PC, a smartphone, or an Internet of Things device.

In Example 31, a method including determining a resource requirement of a software application; determining an operational mode of a baseband modem receiving or transmitting data corresponding to the software application; determining whether the operational mode includes operating with a resource utilization determined resource requirement; and if the operational mode includes operating with a resource utilization greater than the determined resource requirement, sending a signal to the baseband modem, the signal representing the determined resource requirement to the baseband modem.

In Example 32, a method including: sending or receiving data corresponding to an application operating on a device, according to a first operational mode; receiving a signal from the device, the signal representing a resource requirement of the application; and changing operation from the first operational mode to a second operational mode based on the determined resource requirement.

In Example 33, a non-transitory computer readable medium, including instructions which, if executed, would cause a processor: wirelessly receive or wirelessly send data according to a first operational mode, wherein the data correspond to a software application being executed on a battery powered device; determining a resource requirement of the software application; and send a signal representing the determined resource requirement to a baseband modem; wherein the baseband modem is further configured to change from the first operational mode to a second operational mode based on the signal.

In Example 34, the non-transitory computer readable medium of Example 33, wherein the first operational mode includes the baseband modem operating according to a first wireless modulation scheme, and wherein the second operational mode includes the baseband modem operating according to a second wireless modulation scheme, different from the first wireless modulation scheme.

In Example 35, the non-transitory computer readable medium of Example 34, wherein the wireless modulation scheme is a wireless modulation scheme according to the Modulation Coding Scheme (MCS).

In Example 36, the non-transitory computer readable medium of any one of Examples 33 to 35, wherein the first operational mode includes operating with a first wireless throughput, and wherein the second operational mode includes operating with a second wireless throughput, less than the first wireless throughput.

In Example 37, the non-transitory computer readable medium of any one of Examples 33 to 35, wherein the first operational mode includes operating according to a MIMO wireless communication protocol, and wherein the second operational mode includes not operating according to a MIMO wireless communication protocol.

In Example 38, the non-transitory computer readable medium of any one of Examples 33 to 35, wherein the first operational mode includes operating according to a MIMO wireless communication protocol using a first number of antennas, and wherein the second operational mode includes operating according to a MIMO wireless communication protocol using a second number of antennas, fewer than the first number of antennas.

In Example 39, the non-transitory computer readable medium of any one of Examples 33 to 38, wherein the resource requirement is a wireless bandwidth required by the application.

In Example 40, the non-transitory computer readable medium of any one of Examples 33 to 38, wherein the resource requirement is a wireless throughput required by the application.

In Example 41, the non-transitory computer readable medium of any one of Examples 33 to 39, wherein the resource requirement is an estimated power available for the processor.

In Example 42, the non-transitory computer readable medium of any one of Examples 33 to 41, wherein the sending the signal representing the determined resource requirement to the baseband modem includes sending the signal via a Wireless Wire Area Network (WWAN) Application Programming Interface (API).

In Example 43, the non-transitory computer readable medium of any one of Examples 33 to 42, wherein the instructions are further configured to cause the processor to estimate a resource utilization of the first operational mode; determine whether the first operational mode includes operating with a resource utilization greater than the determined resource requirement; if the operational mode includes operating with a resource utilization greater than the determined resource requirement, send a signal to the baseband modem representing the determined resource requirement; and if the operational mode includes operating with a resource utilization less than the determined resource requirement, send no signal to the baseband modem representing the determined resource requirement.

In Example 44, the non-transitory computer readable medium of any one of Examples 33 to 43, wherein determining the resource requirement of the software application includes determining an estimated power requirement for the baseband modem to wirelessly transmit and/or receive data for the software application; and wherein the instructions are further configured to cause the processor to: determine the first operational mode of the baseband modem as an estimated power usage of the baseband modem; determine whether the operational mode includes operating with a resource utilization greater than the determined resource requirement; if the operational mode includes operating with a resource utilization greater than the determined resource requirement, send a signal to the baseband modem representing the determined resource requirement; and if the operational mode includes operating with a resource utilization less than the determined resource requirement, send no signal to the baseband modem representing the determined resource requirement.

In Example 45, the non-transitory computer readable medium of any one of Examples 33 to 44, wherein the signal includes a Modulation and Coding Scheme (MCS) level, an instruction to implement a MIMO protocol, an instruction to discontinue a MIMO protocol, a maximum number of antennas to use in a MIMO protocol; a maximum power usage of the baseband modem, a maximum data transmission speed of the baseband modem, a maximum data reception speed of the baseband modem, an instruction to implement APT, an instruction to implement ET, or any of these.

In Example 46, a non-transitory computer readable medium including instructions, which, if executed, cause a processor to: determine a resource requirement of a software application; determine an operational mode of a baseband modem receiving or transmitting data corresponding to the software application; determine whether the operational mode includes operating with a resource utilization determined resource requirement; and if the operational mode includes operating with a resource utilization greater than the determined resource requirement, send a signal to the baseband modem, the signal representing the determined resource requirement to the baseband modem.

In Example 47, a non-transitory computer readable medium including instructions, which, if executed, cause a processor to send or receiving data corresponding to an application operating on a device, according to a first operational mode; receive a signal from the device, the signal representing a resource requirement of the application; and change operation from the first operational mode to a second operational mode based on the determined resource requirement.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A battery-powered device, comprising:
    a baseband modem, configured to receive or send data according to a first operational mode, wherein the data correspond to a software application being executed on the battery-powered device; and
    a processor, configured to:
        determine a resource requirement of the software application; and send a signal representing the determined resource requirement to the baseband modem;

wherein the baseband modem is further configured to change from the first operational mode to a second operational mode based on the signal; and wherein the processor is further configured to:

estimate a resource utilization of the first operational mode;

determine whether the first operational mode comprises operating with a resource utilization greater than the determined resource requirement;

wherein if the operational mode comprises operating with a resource utilization greater than the determined resource requirement, send a signal to the baseband modem representing the determined resource requirement; and if the operational mode comprises operating with a resource utilization less than the determined resource requirement, send no signal to the baseband modem representing the determined resource requirement.

2. The battery-powered device of claim 1, wherein the first operational mode comprises the baseband modem operating according to a first wireless modulation scheme, and wherein the second operational mode comprises the baseband modem operating according to a second wireless modulation scheme, different from the first wireless modulation scheme.

3. The battery-powered device of claim 2, wherein the wireless modulation scheme is a wireless modulation scheme according to the Modulation Coding Scheme (MCS).

4. The battery-powered device of claim 1, wherein the first operational mode comprises operating with a first wireless throughput, and wherein the second operational mode comprises operating with a second wireless throughput, less than the first wireless throughput.

5. The battery-powered device of claim 1, wherein the first operational mode comprises operating according to a MIMO wireless communication protocol, and wherein the second operational mode comprises not operating according to a MIMO wireless communication protocol; or wherein the first operational mode comprises operating according to a MIMO wireless communication protocol using a first number of antennas, and wherein the second operational mode comprises operating according to a MIMO wireless communication protocol using a second number of antennas, fewer than the first number of antennas.

6. The battery-powered device of claim 1, wherein the resource requirement is a wireless bandwidth required by the application, a wireless throughput required by the application, or an estimated power available for the processor.

7. The battery-powered device of claim 1, wherein the sending the signal representing the determined resource requirement to the baseband modem comprises sending the signal via a Wireless Wire Area Network (WWAN) Application Programming Interface (API).

8. The battery-powered device of claim 1, wherein the signal comprises a Modulation and Coding Scheme (MCS) level, an instruction to implement a Multiple Input Multiple Output (MIMO) protocol, an instruction to discontinue a Multiple Input Multiple Output (MIMO) protocol, a maximum number of antennas to use in a Multiple Input Multiple Output (MIMO) protocol; a maximum power usage of the baseband modem, a maximum data transmission speed of the baseband modem, a maximum data reception speed of the baseband modem, an instruction to implement Average Power Tracking (APT), an instruction to implement Envelope Tracking (ET), or any of these.

9. The battery-powered device of claim 1, wherein the device is a tablet computer, a gaming PC, a smartphone, or an Internet of Things device.

10. A non-transitory computer readable medium, comprising instructions which, if executed, would cause a processor to:

wirelessly receive or wirelessly send data according to a first operational mode, wherein the data correspond to a software application being executed on a battery powered device;

determining a resource requirement of the software application; and send a signal representing the determined resource requirement to a baseband modem;

wherein the baseband modem is further configured to change from the first operational mode to a second operational mode based on the signal;

wherein the instructions are further configured to cause the processor to:

estimate a resource utilization of the first operational mode;

determine whether the first operational mode comprises operating with a resource utilization greater than the determined resource requirement;

if the operational mode comprises operating with a resource utilization greater than the determined resource requirement, send a signal to the baseband modem representing the determined resource requirement; and if the operational mode comprises operating with a resource utilization less than the determined resource requirement, send no signal to the baseband modem representing the determined resource requirement.

11. The non-transitory computer readable medium of claim 10, wherein the first operational mode comprises the baseband modem operating according to a first wireless modulation scheme, and wherein the second operational mode comprises the baseband modem operating according to a second wireless modulation scheme, different from the first wireless modulation scheme.

12. The non-transitory computer readable medium of claim 10, wherein the first operational mode comprises operating with a first wireless throughput, and wherein the second operational mode comprises operating with a second wireless throughput, less than the first wireless throughput.

13. The non-transitory computer readable medium of claim 10, wherein the first operational mode comprises operating according to a MIMO wireless communication protocol, and wherein the second operational mode comprises not operating according to a MIMO wireless communication protocol.

14. The non-transitory computer readable medium of claim 10, wherein the resource requirement is a wireless bandwidth required by the application, a wireless throughput required by the application, or an estimated power available for the processor.

15. The non-transitory computer readable medium of claim 10, wherein the sending the signal representing the determined resource requirement to the baseband modem comprises sending the signal via a Wireless Wire Area Network (WWAN) Application Programming Interface (API).

16. The non-transitory computer readable medium of claim 10, wherein the signal comprises a Modulation and Coding Scheme (MCS) level, an instruction to implement a Multiple Input Multiple Output (MIMO) protocol, an instruction to discontinue a Multiple Input Multiple Output (MIMO) protocol, a maximum number of antennas to use in a Multiple Input Multiple Output (MIMO) protocol; a maximum power usage of the baseband modem, a maximum data transmission speed of the baseband modem, a maximum data reception speed of the baseband modem, an instruction to implement Average Power Tracking (APT), an instruction to implement Envelope Tracking (ET), or any of these.

17. A battery-powered device, comprising:
   a baseband modem, configured to receive or send data according to a first operational mode, wherein the data correspond to a software application being executed on the battery-powered device; and
   a processor, configured to:
      determine a resource requirement of the software application; and
      send a signal representing the determined resource requirement to the baseband modem;
   wherein the baseband modem is further configured to change from the first operational mode to a second operational mode based on the signal;
   wherein determining the resource requirement of the software application comprises determining an estimated power requirement for the baseband modem to wirelessly transmit and/or receive data for the software application; and
   wherein the processor is further configured to:
   determine the first operational mode of the baseband modem as an estimated power usage of the baseband modem; and
   determine whether the operational mode comprises operating with a resource utilization greater than the determined resource requirement; and
   if the operational mode comprises operating with a resource utilization greater than the determined resource requirement, send a signal to the baseband modem representing the determined resource requirement; and
   if the operational mode comprises operating with a resource utilization less than the determined resource requirement, send no signal to the baseband modem representing the determined resource requirement.

18. The battery-powered device of claim 17, wherein the first operational mode comprises the baseband modem operating according to a first wireless modulation scheme, and wherein the second operational mode comprises the baseband modem operating according to a second wireless modulation scheme, different from the first wireless modulation scheme.

19. The battery-powered device of claim 17, wherein the first operational mode comprises operating with a first wireless throughput, and wherein the second operational mode comprises operating with a second wireless throughput, less than the first wireless throughput.

20. A non-transitory computer readable medium, comprising instructions which, if executed, would cause a processor to:
   wirelessly receive or wirelessly send data according to a first operational mode, wherein the data correspond to a software application being executed on a battery powered device;
   determining a resource requirement of the software application; and
   send a signal representing the determined resource requirement to a baseband modem;
   wherein the baseband modem is further configured to change from the first operational mode to a second operational mode based on the signal;
   wherein determining the resource requirement of the software application comprises determining an estimated power requirement for the baseband modem to wirelessly transmit and/or receive data for the software application; and
   wherein the instructions are further configured to cause the processor to:
   determine the first operational mode of the baseband modem as an estimated power usage of the baseband modem;
   determine whether the operational mode comprises operating with a resource utilization greater than the determined resource requirement;
   if the operational mode comprises operating with a resource utilization greater than the determined resource requirement, send a signal to the baseband modem representing the determined resource requirement; and
   if the operational mode comprises operating with a resource utilization less than the determined resource requirement, send no signal to the baseband modem representing the determined resource requirement.

21. The non-transitory computer readable medium of claim 20, wherein the first operational mode comprises the baseband modem operating according to a first wireless modulation scheme, and wherein the second operational mode comprises the baseband modem operating according to a second wireless modulation scheme, different from the first wireless modulation scheme.

22. The non-transitory computer readable medium of claim 20, wherein the first operational mode comprises operating with a first wireless throughput, and wherein the second operational mode comprises operating with a second wireless throughput, less than the first wireless throughput.

23. The non-transitory computer readable medium of claim 20, wherein the first operational mode comprises operating according to a MIMO wireless communication protocol, and wherein the second operational mode comprises not operating according to a MIMO wireless communication protocol.

24. The non-transitory computer readable medium of claim 21, wherein the resource requirement is a wireless bandwidth required by the application, a wireless throughput required by the application, or an estimated power available for the processor.

25. The non-transitory computer readable medium of claim 20, wherein the sending the signal representing the determined resource requirement to the baseband modem comprises sending the signal via a Wireless Wire Area Network (WWAN) Application Programming Interface (API).

* * * * *